United States Patent [19]
Connolly et al.

[11] Patent Number: 6,151,064
[45] Date of Patent: *Nov. 21, 2000

[54] COLOR INSPECTION SYSTEM

[75] Inventors: Christine Connolly, Huddersfield, United Kingdom; Tin Wah William Leung, Hong Kong, Japan

[73] Assignee: Colour Valid Limited, Bradford, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/776,839
[22] PCT Filed: Aug. 11, 1995
[86] PCT No.: PCT/GB95/01903
§ 371 Date: Apr. 2, 1997
§ 102(e) Date: Apr. 2, 1997
[87] PCT Pub. No.: WO96/05489
PCT Pub. Date: Feb. 22, 1996

[30] Foreign Application Priority Data

Aug. 13, 1994 [GB] United Kingdom ............ 9416406

[51] Int. Cl.[7] ................................... H04N 9/47
[52] U.S. Cl. .................. 348/93; 356/71; 382/2; 382/8; 382/44; 382/45; 382/49
[58] Field of Search ............... 348/93, 188, 223, 348/88, 91, 92, 125, 127

[56] References Cited

U.S. PATENT DOCUMENTS

| | | | |
|---|---|---|---|
| 3,767,853 | 10/1973 | Bendell et al. | 350/17 |
| 4,790,022 | 12/1988 | Dennis | 382/8 |
| 4,797,738 | 1/1989 | Kashi et al. | 348/93 |
| 4,845,551 | 7/1989 | Matsumoto | 358/80 |
| 5,237,407 | 8/1993 | Crezee et al. | 348/93 |
| 5,245,399 | 9/1993 | Wertz et al. | 356/71 |
| 5,315,384 | 5/1994 | Heffington et al. | 348/93 |
| 5,617,139 | 4/1997 | Okino | 348/223 |
| 5,729,340 | 3/1998 | Griesbeck et al. | 348/127 |

*Primary Examiner*—Andy Rao
*Assistant Examiner*—Shawn S. An
*Attorney, Agent, or Firm*—Arent Fox Kintner Plotkin & Kahn, PLLC

[57] ABSTRACT

An apparatus and method to control a video camera for the acquisition of a color image under varying image capture conditions includes a video camera having a red, green and blue output. The video camera is provided with a controllable iris aperture, a controllable overall RGB signal gain, independently controllable RGB signal channel gains and a controllable RGB signal channel balance. The controllable parameters are controlled by a control unit. The control unit generates signals from an image signal received from the video camera. The signals are used to correct the controllable parameters to improve camera image capture performance.

17 Claims, 2 Drawing Sheets

COLOR INSPECTION SYSTEM

TECHNICAL FIELD

The present invention relates to the field of colour inspection and particularly, although not exclusively, to a method of control of a video camera for the acquisition of colour image data under varying image capture conditions.

BACKGROUND ART

In on-line manufacturing processes, for ink printed articles such as beverage cans, there is a problem of checking the colour consistency of the ink printing. In particular, there are problems in colour inspection, in capturing a colour image of a moving object on a production line; defining the areas of an article in which the colour is to be monitored, given the complex printed designs on the articles; and transforming a colour image signal into a uniform colour space and efficiently processing the colour image signal in the colour space.

DISCLOSURE OF THE INVENTION

An aim of the present invention is to provide a method and apparatus for effective non-contact colour monitoring of two or three dimensioned objects.

Another aim is to provide colour recognition and monitoring of colours on a multi coloured article.

According to one aspect of the present invention there is provided a method for controlling a video camera in a colour inspection apparatus for inspecting the colour of an object, the method comprising the steps of:

capturing an image of the object and producing an image signal therefrom;

deriving from the image signal one or more error signals relating to a colour error; and controlling a set of controllable parameters of the camera in accordance with the colour error signals, such as to correct the colour error in the captured image.

Specific methods of the present invention may have an advantage over conventional colorimeters or spectrophotometers, on which the object, on which colour is to be recognised must be presented in a flat state in contact with a measuring aperture of the instrument. This is inconvenient for products with curved surfaces eg. beverage cans.

The controllable parameters of the camera may include iris aperture setting; overall electronic gain of the image signals; electronic gain of the individual Red, Green or Blue components of the image signal; balance between the magnitudes of the Red, Green and Blue components of the image signal.

Preferably, the iris aperture and/or electronic gain of the camera are controlled so as to avoid saturation of the image signal.

Preferably, a red, green and blue signal component from a region of a captured image signal corresponding to a known colour object is obtained and the iris aperture and/or overall electronic gain of the camera are controlled in accordance with a colour error signal derived from said red, green or blue signals of the region, such that saturation of said red, green or blue signals is avoided.

Preferably, the iris aperture and/or overall electronic gain of the camera are adjusted to achieve signals in accordance with the formula:

R, G or B signal=F×known R, G or B value where F is a value less than unity.

Preferably, an imbalance between signals of a red channel, a green channel or a blue channel is rectified by controlling the electronic gain of each of the red or blue channels in accordance with a red channel or blue channel control signal corresponding to an image of an object colour of a predetermined red, green and blue balance.

Preferably, variations in successive red channel, green channel or blue channel signals corresponding to successive images of a same object are corrected by control of the iris aperture, overall electronic gain, the gain of each individual red, green or blue channel, or by control of the gain of a processed image signal processed in accordance with a computer program.

Preferably, said control is made in accordance with an image signal, or a component of an image signal, corresponding to a standard object of unvarying reflectance.

Preferably, said signal corresponding to a standard object is controlled so as to be constant.

Preferably, said control is made in accordance with a signal derived from a portion of an image corresponding to a calibration object of unvarying reflectance.

Preferably, said image is a separate calibration image.

Preferably, the light intensity response of the video camera is characterised by:

(i) capturing an image or images of an object or objects of known reflectance;

(ii) for each object, determining an output voltage of an image signal; and (iii) determining a characterising parameters γ (Gamma) k (Intercept) and a (Multiplier) from the output voltage data of step (ii) and the known reflectances of the objects in step (i).

The resolution of the captured image may be selected by controlling the iris aperture and/or overall electronic gain of the video camera.

The resolution of the captured image may be selected by selectively controlling the resolution of an analogue to digital converter for images of different reflectance values.

Thus, specific methods according to the present invention may provide that a commercial video camera may be used as a colour measuring instrument, by controlling the camera to provide accurate and precise data capture under varying image conditions.

The invention includes an apparatus for inspecting the colours of an object, the apparatus comprising:

a video camera for producing an image signal corresponding to the object;

a means for deriving from the image signal and to derive from the image signal one or more error signals.

a control means for controlling a set of controllable parameters of the camera;

wherein the control means is arranged to control the camera in accordance with the colour error signals produced by the inspection means.

Preferably, the control means are arranged to control the iris aperture of the camera, and/or the overall electronic gain of the camera, and/or the electronic gain of an individual red, green or blue channel of the camera.

Preferably, the recognition means is arranged to identify a red, green and blue signal from a region of a captured image signal corresponding to a known colour object, and the control means is arranged to control the iris aperture and/or overall electronic gain of the camera having regard to said red, green or blue signals of the region, such that saturation of said red, green or blue signals is avoided.

Preferably, the control means are arranged to control the iris aperture and/or overall electronic gain of the camera in accordance with the formula:

R, G or B signal=F×known R, G or B value
where F is a value less than unity.

Preferably, a resolution of a captured image is selected by selectively controlling the resolution of an analogue to digital converter for images of different reflectance values.

According to a second aspect of the present invention, there is provided a colour inspection method, for recognising the colours of a product, and deciding whether each colour is acceptable, the method comprising the steps of:

capturing an image of the product on a video camera and producing an image signal;

recognising a colour of the product and generating a colour error signal in accordance with an error between the recognised colour and a reference colour;

controlling the video camera to optimise the image capture of the camera;

using intensity independent chromaticity metrics to measure surface colour in three dimensional matte objects; and using a uniform colour space to decide whether each colour is an acceptable match to the reference colour.

The invention includes a colour recognition and control apparatus, for recognising a colour of a product, and a decision apparatus for assessing the acceptability of the colour.

Preferably, the colour recognition apparatus comprises:

a video camera for capturing an image of the product;

a colour recognition means for recognising a colour of the product and for generating a colour error signal in accordance with a detected colour error of the product colour;

a camera control means for controlling the video camera to optimise the image capture of the camera; and a means for computing the acceptability of the product colour.

Preferably, the decision apparatus is capable of assessing the acceptability of the colour of the product.

The decision apparatus may comprise an application specific integrated circuit, or may comprise a central processing unit of a computer, eg. a personal computer.

Commercial video cameras are designed for the capture of images such that scenes may be reproduced to a standard acceptable to the human eye. The human vision system is capable of interpolation and interpretation, and is tolerant of errors in the accuracy of colour reproduction. Specific methods and embodiments according to the present invention may enable correction or compensation of the errors occurring in the colour reproduction characteristics of various models of commercially available video cameras.

The embodiments and methods of the present invention may enable interface to a conventional commercially available video camera in order to automatically apply a correction and compensation appropriate to the image captured by the video camera, to reduce the errors occurring in the colour reproduction characteristics of the video cameras.

DESCRIPTION OF THE DRAWINGS

For a better understanding of the invention, and to show how embodiments of the same may be carried into effect, reference will now be made, by way of example, to the accompanying diagrammatic drawings, in which.

BEST MODES OF CARRYING AND THE INVENTION

Figure 1:
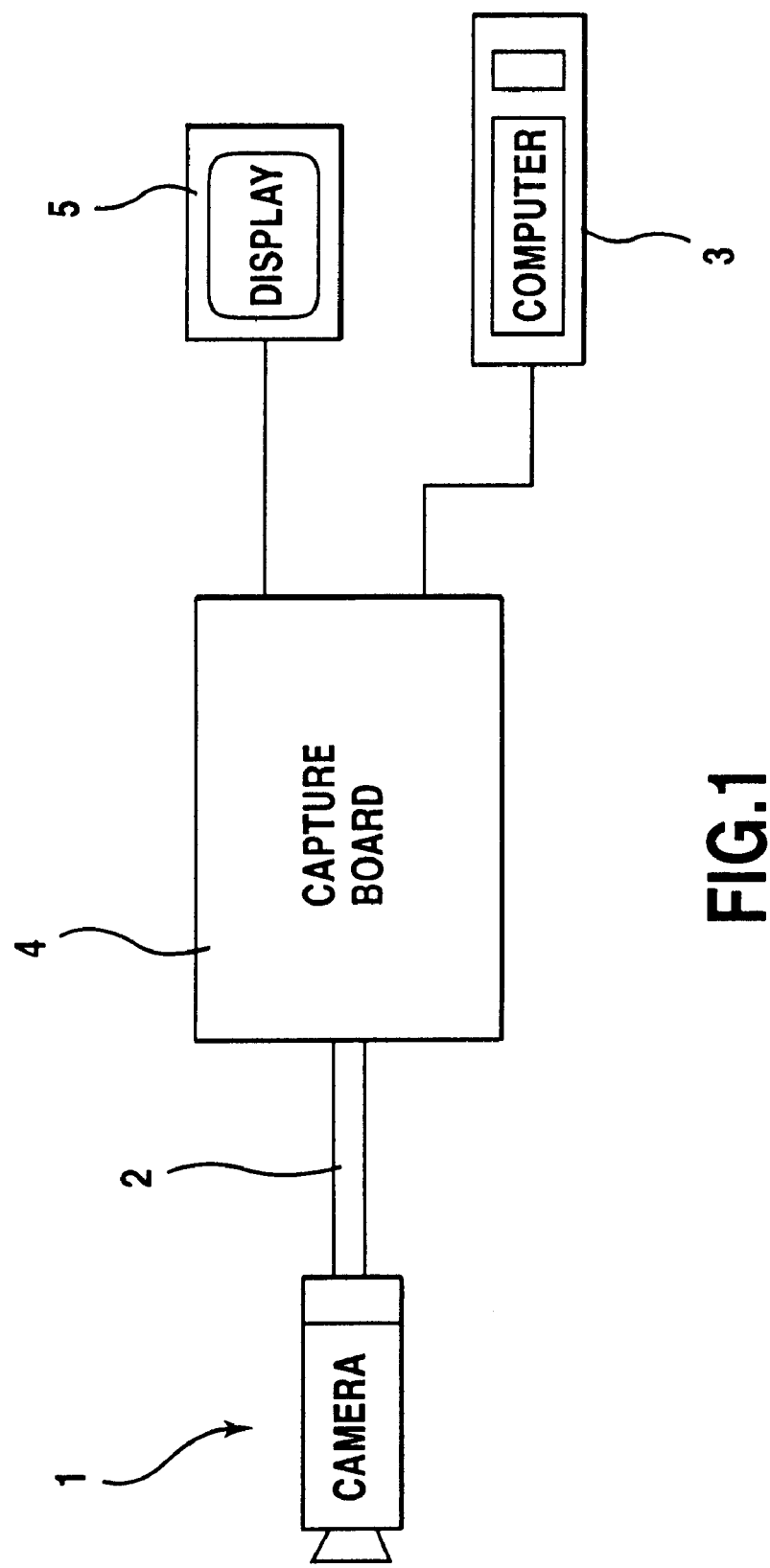
FIG. 1 shows in schematic form a first colour recognition apparatus according to a first specific embodiment of the present invention.

Referring to FIG. 1 of the accompanying drawings, there is shown a first apparatus according to a first specific embodiment of the present invention. The first colour recognition apparatus comprises an interface unit for interfacing to a conventional commercially available video camera 1 having a red, green, blue output (RGB output) and having a controllable iris aperture, a controllable overall RGB signal channel gain, independently controllable RGB signal channel gains, and a controllable RGB signal channel balance. The interface comprises an RS232C bus 2 to enable remote control of the camera; and a conventional commercially available personal computer 3 having a display 5 and a conventional commercially available image capture board 4.

In accordance with a first specific method of the present invention, the computer is adapted for control of the camera via the RS232C databus, by means of a dedicated application program. The dedicated application program may form part of a larger computer program, or may be run in conjunction with other applications programs.

The conventional video camera has various shortcomings which has hitherto prevented the use of such commercially available video cameras for colour recognition for use, for example colour standardisation of products in manufacturing processes. The inventors have identified the shortcomings in a range of such commercially available video cameras as follows:

1. Red, Green, Blue (RGB) channel saturation;
2. RGB signal imbalance;
3. RGB signal capture repeatability;
4. Non linearity;
5. Poor resolution.

The computer in the first colour recognition apparatus is adapted to control the conventional video camera via the RS232C databus to reduce the errors 1–5 above in a selected video camera by a method as follows;

RGB saturation correction.

Where an image contains small areas of relatively bright colour compared to the remainder of the image, saturation of one or more of the RGB video channels may occur. This may because the video cameras auto gain controls, or the auto iris controls respond to an average level of signal from the whole image, without taking into account any localised bright spots.

According to the first specific method, a calibration object of known colour is included in the object, so as to appear, at a predetermined place in the image captured by the camera. The camera iris aperture, and the overall electronic gain of the camera are adjusted by control from the computer such that the R,G and B signals from the predetermined image area are reduced below a set of predetermined known values. The predetermined known values are found as the RGB signals corresponding to an image of the calibration object of known colour. When the image is re-captured, after correction of the aperture and gain every colour present in the complete image may thereby be represented by an unsaturated R, G or B signal.

The aperture and electronic gain of the camera are controlled to achieve signals in accordance with the equation.

R, G or B signal=0.8×known R, G or B value.

The iris aperture control is effected by making a slight adjustment and calculating the intensity gradient, and then using this to calculate the required aperture and then using this to calculate the required aperture adjustment.

The iris aperture control is $$\text{intensity gradient} = \frac{(\text{present intensity} - \text{previous intensity})}{(\text{present aperture} - \text{previous aperture})}$$

$$\text{aperture adjustement} = \frac{\text{intensity difference}}{\text{intensity gradient}}$$

where
- intensity gradient is the intensity gradient of one of the red, green and blue signals,
- present intensity is the present intensity of one of the said signals,
- previous intensity is the previous intensity of one of the said signals,
- aperture adjustment is the calculated iris adjustment which should be carried out,
- intensity difference is one of the intensity difference of the said signals to the target one.

RGB imbalance correction.

If any particular hue predominates an image captured by the camera, for example if small patches of a different colour are set against a blue background, then a conventional camera may produce an unbalanced R,G or B signal. The cameras auto balance control tends to compensate the actual overall blueness in the image by reducing the gain on the blue channel relative to the red and green channels.

In certain cameras, particularly tube cameras, the signals corresponding to the small patches of colour in the image may be contaminated by the signals corresponding to parts of the image which contain large neighbouring areas of background colour, with the result that the red, green and blue values are unbalanced by a blue value which is relatively high.

In the tube camera, the effect of a relatively large blue signal value may counteract the effect of the reduced gain on the blue channel caused by operation of the auto balance control, so that there may be partial cancelling of the first error caused by the auto balance control, and the second error of the relatively high blue value.

According to the first method, any RGB imbalance is rectified by including in every image a calibration colour of known balance, and by arranging that the R,G and B signals corresponding to the area of image containing the known balance calibration colour are in correct proportion relative to each other. This is achieved by controlling the electronic gain of tie individual RGB channels, or by controlling the balance control of the camera, or by correction of the balance via program control, For example, via the individual gain control, the balance could be adjusted by making a small change to the R channel gain and calculating the gain gradient, and then by using this to make the required adjustment to the gain of the R channel, A similar technique would be carried out with the B channel gain.

The individual gain control is:
For red channel $$R \text{ gain gradient} = \frac{\text{present } R - \text{previous } R}{\text{Present } R \text{ gain} - \text{previous } R \text{ gain}}$$

$$R \text{ gain adjustment} = \frac{\text{target } R - \text{present } R}{R \text{ gain gradient}}$$

where target $R = \text{calibration } R \times \frac{\text{Present } G}{\text{Calibration } G}$ For blue channel $$B \text{ gain gradient} = \frac{\text{present } B - \text{previous } B}{\text{present } B \text{ gain} - \text{previous } B \text{ gain}}$$

$$B \text{ gain adjustment} = \frac{\text{target } B - \text{present } B}{B \text{ gain gradient}}$$

where target $B = \text{calibration } B \times \frac{\text{present } G}{\text{calibration } G}$ RGB capture repeatability.

An image captured by a conventional video camera may result in RGB signals which vary from RGB signals resulting from the image recaptured on a different occasion. Thus, there is a repeatability problem in RGB signal recapture. This may arise from various different causes including variations of camera temperature, changing source light intensity, changed aperture gain or balance settings of the camera.

According to the first method, an object of unvarying reflectance is included in the image, or is captured in a separate calibration image. The camera is adjusted via computer control, to ensure that the signals relating to the standard object, match a predetermined calibrated level. This is achieved by computer controlling the camera aperture, the overall electronic gain of the camera, the gains of the individual channels of the camera and by software correction of the gain.

Light intensity linearity corrections.

The camera may vary in linearity of response to light intensity according to the following equation.

response=$a(\text{intensity})^{1/\gamma}+k$ where a and k are constants.

When $\gamma=1$, the relation between output and intensity is linear. However, generally $\gamma$ is not unity for most video cameras, and the rate of change of RGB signal output with intensity is greater at low intensity values than for high intensity values. It is generally unclear from a camera manufacturers data what the $\gamma$ value for a particular camera is.

According to the first method, values for $\gamma$, k and a for a particular camera are established by capturing an image of a series of objects of known reflectance, and finding a least squares fit to the characteristic of output voltage and reflectance. The output signals are thus corrected so that they are proportional to reflectance and pass through the origin.

According to the first method, the video camera may be characterised such that the camera can be used for accurate measurement of the reflectance of any object.

Resolution at low intensities.

Where a video camera with a near unity $\gamma$ is used for image capture, the analogue to digital converters (ADC's) of the image capture board of the computer may give quantisation errors which are significant at low camera light intensity levels.

According to the first method, the image is recaptured using a gain of say +9 dB or +18 dB, in order to provide improved resolution at low intensity values. The signals from the recaptured image are corrected for $\gamma$ (Gamma) and k (Intercept) as described above, and then scaled back to their OdB equivalent according to the formula:

signal OdB equivalent=(signal at 9 db)/2.82 for +9 dB gain recapture, or for +18 dB gain recapture according to the formula:

$$\text{signal 0dB equivalent} = (\text{signal at 18 dB})/7.94$$

Alternatively, according to the first method, an analogue to digital convertor of higher resolution may be used to process images or parts of images at low intensity values.

By low intensity values, is meant the intensity values at which the human eye is most sensitive to changes in light intensity.

Figure 2:
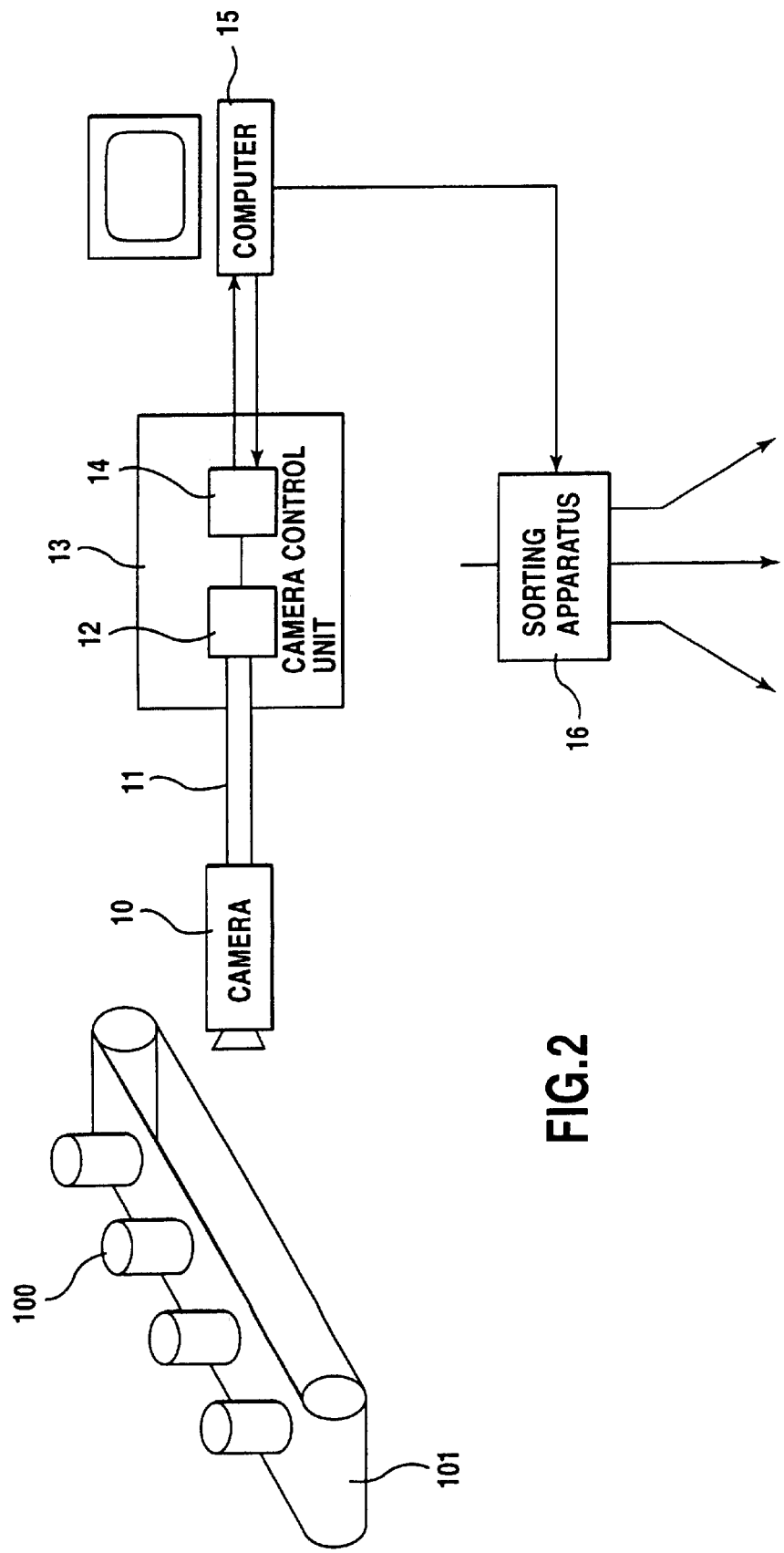
FIG. 2 shows in schematic form, a second colour inspection apparatus according to a second specific embodiment of the present invention.

Referring to FIG. 2 of the accompanying drawings, there is shown a second embodiment colour recognition apparatus, used to monitor a colour of a product 100 of a production line 101.

The second embodiment comprises a conventional video camera 10 controlled via an RS232C data link 11 from an RS232C interface 12 contained in a camera control unit 13; the camera control unit 13 also contains an application specific integrated circuit (ASIC) 14 for performing adjustments to the camera aperture, overall electronic gain, gain of the individual RGB channels, and electronic balance control of the camera; a decision making control apparatus 15, which receives a signal from the ASIC 14, a computer, eg. a personal computer 15 for receiving signals concerning the overall gain, individual channel gain, balance, and aperture values of the camera 10 from the ASIC 14, and for outputting a pass/fail decision depending upon whether the computer 15 determines that the signals emanating from the camera 10 and ASIC 14 are within preset acceptable levels, the preset acceptable levels. relating to the maximum colour difference acceptable for a predetermined colour.

The second apparatus is operated according to a second method, the second method being substantially similar to the first method. However, the second apparatus may have an advantage that the functions of RGB saturation correction, RGB imbalance correction, RGB capture repeatability correction, RGB signal linearity and intercept correction and RGB resolution correction are automatically carried out by the ASIC 14, instead of by a suitably programmed PC, allowing a faster response time and faster correction times by use of the ASIC, and thereby allowing a faster rate of image processing and camera correction. To ensure a high data rate interface between the camera and the ASIC, the camera may be modified to interface directly with the ASIC which may be provided as integral part of the camera.

The second embodiment may be particularly suitable for use on a production line 16 where colour monitoring of individual objects passing along the production line is required.

In either of the first or second methods above, the, computer applies an appropriate colour theory for identifying the colour of the object, from the image received by the camera. An appropriate colour theory may include a colour transformation of the RGB signal based upon a logarithmic function, for example, a colour transformation based on a logarithmic colour space $L_L a_L b_L$; where $L_L$ is the panchromatic luminance metric, and $a_L$ and $b_L$ are the two chromaticity coordinates, or any other colour transformation yielding intensity—independent chromaticity coordinates. This is particularly important for the inspection of three dimensional matte objects, enabling surface colour to be distinguished in spite of shadow effects.

It may also include a colour transformation lending to a uniform colour space, designed to enable acceptability decisions to be made in accordance with human perception of colour difference. Such uniform colour spaces include C.I.E. 1976 L•a•b•and L•u•v•equations, and may be found in R. Macdonald (Ed) "Colour Physics for Industry"; Society of Dyers and Colourists, 1987.

In a modified version of the second embodiment, acceptability decision calculations, eg. for colour space transformations, may be performed by the ASIC.

Embodiments of the present invention may enable a conventional video camera to measure the colour of a three dimensional object, without contact to the object and whilst leaving the object in situ on a production line. Further, specific embodiments and methods of the present invention may enable measurement of colour from a multicoloured object. By providing colour acceptability decision at an early stage in the production process,, excessive waste is avoided and production costs reduced.

Further, specific embodiments and methods according to the present invention are not restricted to static objects, but may enable colour recognition of moving objects.

The reader's attention is directed to all papers and documents which are filed concurrently with or previous to this specification in connection with this application and which are open to public inspection with this specification, and the contents of all such papers and documents are incorporated herein by reference.

All of tie features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method for controlling a video camera used for acquisition of colour image data under varying image capture conditions, the method comprising the steps of:

capturing images of an object under inspection and of a calibration object;

producing an image signal and a calibration signal therefrom;

deriving from the image signal and the calibration signal one or more camera error signals relating to a colour error in the image signal; and controlling a set of controllable parameters of the video camera in accordance with the camera colour error signals, such as to correct the colour error in the captured image or in the image signal produced therefrom, wherein the controllable parameters of the video camera comprise at least one of an iris aperture setting, an overall electronic gain of the image signals; an electronic gain of individual Red, Green or Blue components of the image signal, and a balance between magnitudes of the Red, Green, and Blue components of the image signal and any combination thereof.

2. A method according to claim 1 characterised in that the iris aperture setting and/or electronic gain of the camera are controlled so as to avoid saturation of the image signal.

3. A method according to claim 1, characterised in that a red, green and blue signal component of the image signal from a region of a captured image corresponding to a known colour object is obtained; and the iris aperture and/or overall electronic gain of the camera are controlled in accordance with a colour error signal derived from said red, green or blue signals of the region, such that saturation of said red, green or blue signals is avoided.

4. A method according to claim 1 characterised in that the iris aperture and/or overall electronic gain of the camera are adjusted to achieve signals in accordance with the formula:

R, G or B signal value=F×known R, G or B value where F is a value less than unity.

5. A method according to claim 1 characterised in that an imbalance between signals of a red channel, a green channel or a blue channel is rectified by controlling the electronic gain of each of the red or blue channels in accordance with a red channel or blue channel control signal corresponding to an image of an object of a colour having a predetermined red, green and blue balance.

6. A method according to claim 1 characterised in that variations in successive red channel, green channel or blue channel signals corresponding to successive images of a same object are corrected by control of the iris aperture, overall electronic gain of the image signal channel, the gain of each individual red, green or blue channel, or by control of the gain of a processed image signal processed in accordance with a computer program.

7. A method according to claim 6 characterised in that said control is made in accordance with an image signal, or a component of an image signal, corresponding to a standard object of unvarying reflectance.

8. A method according to claim 7 characterised in that said signal corresponding to a standard object is controlled so as to be constant.

9. A method according to claim 6 characterised in that said control is made in accordance with a signal derived from a portion of an image corresponding to a calibration object of unvarying reflectance.

10. A method according to claim 9 characterised in that said image comprises a calibration image.

11. A method according to claim 1 in which a light intensity response of the video camera is characterised by:

(i) capturing an image or images of an object or objects of known reflectance;

(ii) for each object, determining an output voltage of an image signal; and (iii) determining characterising parameters $\gamma$ (Gamma), K (Intercept), and a (Multiplier) from the output voltage data of step (ii) and the known reflectances of the objects in step (i).

12. A method according to claim 11 characterised in that a resolution of the captured image is selected by controlling an iris aperture and/or overall electronic gain of the video camera.

13. A method according to claim 12 characterised in that the resolution of the captured image may be selected by selectively controlling the resolution of an analogue to digital converter for images of different reflectance values.

14. An apparatus for acquisition of colour image data under varying image capture conditions, the apparatus comprising:

a video camera for producing an image signal corresponding to an object and a calibration signal corresponding to a calibration object;

a means for deriving from the image signal and the calibration signal one or more camera error signals relating to a colour error in the image signal; and a control means for controlling a set of controllable parameters of the camera;

wherein the control means is arranged to control the video camera in accordance with the camera colour error signal to correct the colour error in the image signal and wherein the controllable parameters of the video camera comprise at least one of an iris aperture setting, an overall electronic gain of the image signals, an electronic gain of individual Red, Green or Blue components of the image signal, and a balance between magnitudes of the Red, Green, and Blue components of the image signal and any combination thereof.

15. An apparatus according to claim 14 characterised by comprising a recognition means arranged to identify a red, green and blue signal from a region of a captured image signal corresponding to a known colour object, and the control means being arranged to control the iris aperture and/or overall electronic gain of the camera having regard to said red, green or blue signals of the region, such that saturation of said red, green or blue signals is avoided.

16. An apparatus according to claim 14 characterised in that the control means are arranged to control the iris aperture and/or overall electronic gain of the camera in accordance with the formula:

R, G or B signal value=F×known R, G or B value where F is a value less than unity.

17. An apparatus according to claim 14 characterised in that a resolution of a captured image is selected by selectively controlling the resolution of an analogue to digital converter for images of different reflectance values.

* * * * *